(12) United States Patent
Galaj et al.

(10) Patent No.: US 6,580,867 B2
(45) Date of Patent: Jun. 17, 2003

(54) SUPPORT FOR SMALL-DIAMETER FILAMENTARY ELEMENTS AND A BUNDLE OF FILAMENTARY ELEMENTS HELD TOGETHER BY THE SUPPORT

(75) Inventors: Stanislas Galaj, Arcueil (FR); Sophie Vanpoulle, Gif sur Yvette (FR); Xavier Andrieu, Bretigny sur Orge (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/902,782

(22) Filed: Jul. 12, 2001

(65) Prior Publication Data

US 2002/0006262 A1 Jan. 17, 2002

(30) Foreign Application Priority Data

Jul. 13, 2000 (FR) .............................................. 00 09201

(51) Int. Cl.$^7$ .............................. G02B 6/00; F16L 3/00; H01R 9/22
(52) U.S. Cl. ........................ 385/137; 385/134; 248/49; 248/65; 248/68.1; 439/719; 439/942; 174/117 F; 174/72 A
(58) Field of Search ................................ 385/137, 134, 385/135, 136; 248/49, 65, 68.1; 439/719, 942; 174/117 F, 72 A

(56) References Cited

U.S. PATENT DOCUMENTS

| 5,146,532 | A | * | 9/1992 | Hodge | 385/136 |
|---|---|---|---|---|---|
| 5,222,184 | A | * | 6/1993 | Foss | 385/135 |
| 5,566,268 | A | * | 10/1996 | Radliff et al. | 385/137 |
| 5,566,269 | A | * | 10/1996 | Eberle, Jr. et al. | 385/137 |
| 5,625,737 | A | * | 4/1997 | Saito | 385/137 |
| 6,195,496 | B1 | * | 2/2001 | Daoud | 385/137 |
| 6,240,236 | B1 | * | 5/2001 | Daoud | 385/137 |
| 6,249,636 | B1 | * | 6/2001 | Daoud | 385/137 |
| 6,259,851 | B1 | * | 7/2001 | Daoud | 385/135 |
| 6,353,697 | B1 | * | 3/2002 | Daoud | 385/136 |

FOREIGN PATENT DOCUMENTS

| DE | 4405066 C | 5/1995 | G02B/6/36 |
|---|---|---|---|
| FR | 0019-026 A | 11/1980 | G02B/5/16 |
| JP | 53-56043 | 5/1978 | G02B/5/14 |
| WO | WO96-38752 | 12/1996 | G02B/6/44 |

* cited by examiner

Primary Examiner—Brian Healy
Assistant Examiner—Kevin S Wood
(74) Attorney, Agent, or Firm—Sughrue Mion, PLLC

(57) ABSTRACT

The filamentary elements are of a diameter that is less than or equal to 1 millimeter. The support comprises longitudinal channels each intended to house a respective filamentary element, each channel being defined by two longitudinal walls interconnected by a web and defining a longitudinal channel opening, the width of said longitudinal opening being variable by elastically deforming the longitudinal walls between an access configuration giving access to the channel enabling a filamentary element to pass through said opening and a retaining configuration for retaining a filamentary element in the channel. The filamentary elements are selected from optical fibers and electrical coaxial cables.

20 Claims, 1 Drawing Sheet

SUPPORT FOR SMALL-DIAMETER FILAMENTARY ELEMENTS AND A BUNDLE OF FILAMENTARY ELEMENTS HELD TOGETHER BY THE SUPPORT

The present invention relates to a support for small-diameter filamentary elements and to a bundle of filamentary elements interconnected by the support.

The invention applies in particular to installations comprising bundles of optical fibers or of electrical coaxial cables of small diameter.

BACKGROUND OF THE INVENTION

Amongst the optical fibers commonly used in a cable telecommunications network, it is common practice to distinguish between inorganic optical fibers, generally made of silica, and optical fibers made of synthetic material.

In general, an inorganic optical fiber comprises a core of doped silica coated in intermediate inorganic optical cladding and in a peripheral organic sheath made of synthetic material. In general, the peripheral sheath is constituted by a flexible first sheath coated in a hard second sheath. An optical fiber of this type commonly has a diameter of 250 micrometers ($\mu$m).

An optical fiber of synthetic material is commonly of larger diameter than an inorganic optical fiber. A common diameter for an optical fiber of synthetic material is often around 500 $\mu$m, and in some cases can be as much as 1 millimeter (mm).

In the state of the art, it is known to hold a plurality of optical fibers together by means of a ribbon of photopolymerizable resin. A ribbon of this type normally enables two to sixteen optical fibers to be held together. In conventional manner, the optical fibers to be held together are coated in liquid resin, and the resin is cured by being polymerized on exposure to ultraviolet radiation.

The various optical fibers of a bundle are usually identified by means of a color code. As a result, the resin ribbon in which the optical fibers are embedded is generally transparent, so as to enable an operator to identify each optical fiber on the basis of its color.

If an operator seeks to gain access to a particular optical fiber embedded in the ribbon, the ribbon needs to be torn possibly by means of a thread provided for this purpose in the ribbon. After the operator has intervened, the tear in the ribbon must be repaired.

Furthermore, polymerization of the ribbon resin is an exothermic reaction that can give rise to harmful thermal stresses in the optical fibers embedded in the resin.

OBJECTS AND SUMMARY OF THE INVENTION

An object of the invention is to hold small-diameter filamentary elements together such as optical fibers or electrical coaxial cables using means that facilitate access to each filamentary element and, where appropriate, enable different bundles and filamentary elements to be identified.

To this end, the invention provides a support for small-diameter filamentary elements having a diameter less than or equal to 1 millimeter, in particular optical fibers and/or electrical coaxial cables, the support comprising longitudinal channels each intended to house a respective filamentary element, each channel being defined by two longitudinal walls interconnected by a web and defining a longitudinal channel opening, the width of said longitudinal opening being variable by elastically deforming the longitudinal walls between an access configuration giving access to the channel enabling a filamentary element to pass through said opening and a retaining configuration for retaining a filamentary element in the channel.

According to other characteristics of this support:

- the longitudinal openings of successive channels open out alternately into opposite faces of the support, the webs of the channels alternating with the longitudinal walls of said channels so as to define a cross-section for the support that zigzags back and forth;
- each longitudinal channel is of substantially triangular cross-section when its longitudinal opening is in the retaining configuration;
- the longitudinal openings of the successive channels open out into the same face of the support;
- each longitudinal wall has a free edge provided with a retaining bead for retaining filamentary elements in the channels;
- the face of the support into which the longitudinal openings of the channels open out is provided with a removable cover for closing the channels; and
- the support is made out of an extruded or calendared thermoplastic material.

The invention also provides an assembly of at least two supports, each as defined above, wherein each support has a longitudinal wall defining a side edge of the support that is provided with coupling means for co-operating with complementary coupling means carried by another support.

According to another characteristic of this assembly, the complementary coupling means of two supports co-operate with each other by snap-fastening.

The invention also provides a bundle of small-diameter filamentary elements of diameter less than or equal to 1 mm, wherein the filamentary elements are held together by a support as defined above.

According to another characteristic of this bundle, the filamentary elements are selected from optical fibers and electrical coaxial cables.

BRIEF DESCRIPTION OF THE DRAWING

The invention will be better understood on reading the following description given purely by way of example and made with reference to the accompanying drawing, in which.

MORE DETAILED DESCRIPTION

Figure 1:
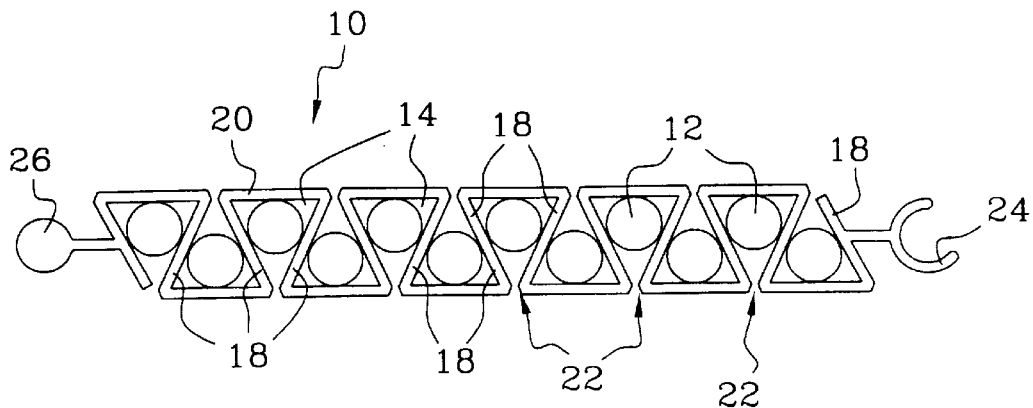
FIGS. 1 and 2 are diagrammatic cross-section views through a support for filamentary elements constituting a first embodiment of the invention, in which each longitudinal opening of a channel is respectively in a configuration in which a filamentary element is retained in the channel and a configuration giving access to the channel.
Figure 2:
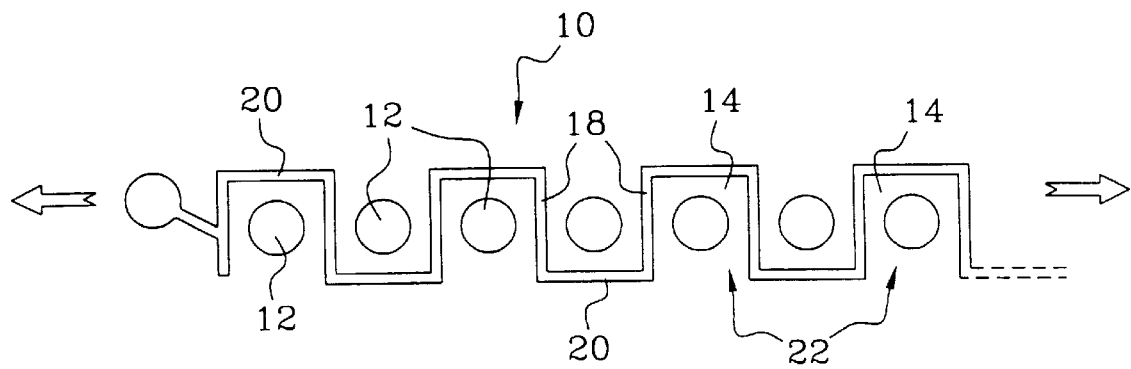

FIGS. 1 and 2 show a support 10 constituting a first embodiment of the invention for supporting small-diameter filamentary elements 12 having a diameter that is less than or equal to one millimeter.

In the example shown, the filamentary elements 12 are conventional optical fibers for use in a telecommunications network, for example. The optical fibers 12 are made out of an inorganic material or a synthetic material. An inorganic type optical fiber comprises, for example, a doped silica core coated in inorganic cladding and an organic sheath that commonly comprises two layers of synthetic material.

In a variant, the filamentary elements 12 can be constituted by electrical coaxial cables of the kind commonly used in telecommunications installations or in medical equipment.

The support 10 is preferably designed to carry a dozen filamentary elements 12. Nevertheless, the number of filamentary elements 12 carried by the support can be less than or greater than one dozen.

The support 10 is generally plane and elongate in shape, and it comprises longitudinal channels 14 each intended to house one filamentary element 12.

Each channel 14 is defined by two longitudinal walls 18 interconnected by a web 20. The two longitudinal walls 18 of a single channel 14 define a longitudinal opening 22. The width of this longitudinal opening 22 can be varied by elastically deforming the longitudinal walls 18 between a configuration giving access to the channel 14, as shown in FIG. 2 allowing a filamentary element 12 to pass through said opening 22, and a configuration for holding a filamentary element 12 in the channel 14, as shown in FIG. 1.

When the longitudinal opening 22 of a channel 14 is in the holding configuration, the filamentary element 12 contained in the channel 14 is held transversely in the channel 14 while still being capable of sliding longitudinal in the channel 14.

In the embodiment shown in FIGS. 1 and 2, the longitudinal openings 22 of successive channels 14 open out alternately into opposite faces of the support 10. Thus, channel webs 20 alternate with longitudinal channel walls 18 so as to define a support 10 whose cross-section zigzags back and forth. More particularly, with reference to FIG. 1, it can be seen that each of the channels 14 is of substantially triangular section when its longitudinal opening 22 is in the retaining configuration.

The thickness of the longitudinal walls 18 and of the cores 20 preferably lies in the range 20 $\mu$m to 50 $\mu$m.

The support 10 is made of synthetic material, preferably a thermoplastic, using conventional means such as means for extruding section members or calendaring means.

With reference again to FIG. 1, it can be seen that the support 10 comprises two longitudinal walls each defining a side edge of the support 10. Each side edge is provided with coupling means 24, 26 for co-operating with complementary coupling means carried by another support similar to the support 10 as shown in FIGS. 1 and 2.

It is thus possible to juxtapose two similar supports 10 side by side so as to form an assembly of supports carrying filamentary elements 12.

FIG. 1 shows one side edge of the support 10 (on the right in the figure) provided with a female coupling member 24 designed to snap-fasten with a male coupling member 26 of another support 10, such as the male member 26 carried by the left side edge of the support 10 as shown in FIG. 1.

The invention thus makes it possible to build up bundles of small-diameter filamentary elements 12 of diameter that is less than or equal to one millimeter, by holding these elements using at least one support 10. The longitudinal openings 22 of the channels make it possible to obtain visual access to the filamentary elements 12 contained in the channel so as to see their colors and identify them.

It is easy to access a particular filamentary element 12 by splaying apart the longitudinal walls 18 to the channel 14 in which the particular filamentary element 12 is housed.

Furthermore, access to all of the filamentary elements 12 can easily be obtained by moving the side edges of the support 10 apart as represented by arrows in FIG. 2, thereby placing all of the longitudinal openings in their configuration giving access to the channels 14.

When the side edges of the support 10 are no longer being pulled apart, the longitudinal openings 22 automatically return to their retaining configuration.

The longitudinal openings 22 give visual access to each filamentary element 12 so there is no need for the support 10 to be transparent. The support 10 can thus of various colors, thereby making it possible to distinguish each support 10 in an assembly of supports by means of a color code, and where appropriate to combine the color code of the filamentary elements 12 with the color code of the supports 10.

Filamentary elements can be inserted into the channels of a support by forcing the filamentary elements 12 through the longitudinal openings 22 so as to cause the side walls 18 to splay apart. Such forced insertion can be performed by means of rollers pressing filamentary elements 12 into the longitudinal openings 22.

Figure 3:
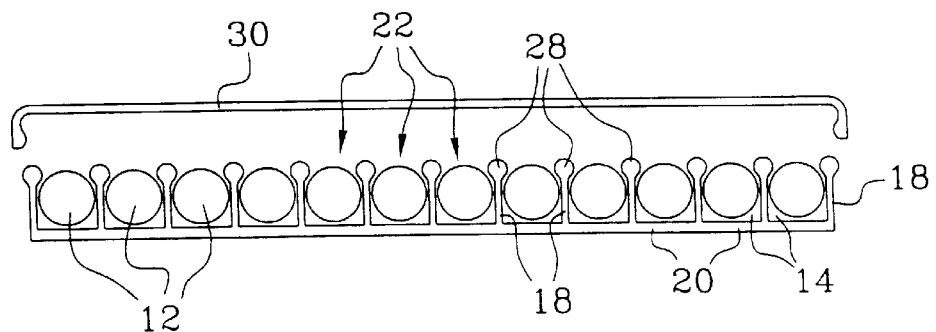
FIG. 3 is a diagrammatic cross-section view of a support for filamentary elements constituting a second embodiment of the invention.

FIG. 3 shows a second embodiment of a support 10 for filamentary elements 12. In this embodiment, the longitudinal openings 22 of successive channels 14 all open out into the same face of the support 10.

Each longitudinal wall 18 has its free edge provided with a bead 28 for retaining the filamentary elements 12.

The face of the support into which the longitudinal openings 22 of the channels 14 open out is preferably provided with a cover 30 for closing the channels 14.

The advantages of the invention include that of making it possible to hold together small-diameter filamentary embodiments such as optical fibers or coaxial cables using means that give easy access to each filamentary element 12.

The channels 14 of the support are of dimensions that are adapted specifically to retain either inorganic optical fibers usually having a diameter of 250 $\mu$m, or else synthetic type optical fibers usually having a diameter of about 500 $\mu$m.

The support of the invention can also hold together coaxial cables having dimensions similar to those of the optical fibers mentioned above. As a general rule, the support of the invention is well adapted to holding together filamentary elements of a diameter that is less than or equal to 1 millimeter.

What is claimed is:

1. A support for small-diameter filamentary elements having a diameter less than or equal to 1 millimeter, in particular optical fibers and/or electrical coaxial cables, the support comprising longitudinal channels each intended to house a respective filamentary element, each channel being defined by two longitudinal walls interconnected by a web and defining a longitudinal channel opening, the width of said longitudinal opening being variable by elastically deforming the longitudinal walls between an access configuration giving access to the channel enabling a filamentary element to pass through said opening and a retaining configuration for retaining a filamentary element in the channel; and wherein the longitudinal openings of successive channels open out alternately into opposite faces of the support, the webs of the channels alternating with the longitudinal walls of said channels so as to define a cross-section for the support that zigzags back and forth.

2. A support according to claim 1, wherein each longitudinal channel is of substantially triangular cross-section when its longitudinal opening is in the retaining configuration.

3. A support according to claim 1, the support being made out of an extruded or calendared thermoplastic material.

4. The support according to claim 1, wherein the filamentary elements are selected from optical fibers and electrical coaxial cables.

5. A support for filamentary elements comprising:
- a series of extending parallel channels extending in a longitudinal direction of said support;
- wherein each channel is defined by two walls extending in the longitudinal direction of said support, said two walls are interconnected by a web on one side of said support, and said two walls define an opening extending in the longitudinal direction of said support on another side of said support opposite to said web; and
- wherein a width of said opening for each channel in a direction orthogonal to said series of parallel channels is variable by elastically deforming said longitudinal walls between an access configuration giving access to said channel enabling a filamentary element to pass through said opening and a retaining configuration for retaining the filamentary element in said channel; and
- wherein the respective openings of successive channels alternately open out on opposite faces of said support.

6. The support according to claim 5, wherein said respective webs of the channels alternate with said walls of said channels so as to define a cross-section for said support that zigzags back and forth.

7. The support according to claim 5, wherein each channel has a substantially triangular cross-section when its longitudinal opening is in the retaining configuration.

8. The support according to claim 5, wherein said support is made out of an extruded or calendared thermoplastic material.

9. The support according to claim 5, further comprising filamentary elements held together by said support in respective channels, and wherein substantially an entire length of each of the filamentary elements in the support extends within the support.

10. The support according to claim 5, further comprising filamentary elements held together by said support in respective channels, and wherein each of the filamentary elements is loosely held and freely slides within its respect channel in the longitudinal direction of the support.

11. The support according to claim 5, further comprising filamentary elements of diameter less than or equal to 1 millimeter held together by said support.

12. The support according to claim 11, wherein said filamentary elements are optical fibers or electrical coaxial cables.

13. An assembly of two supports, each support comprising:
- a series of extending parallel channels extending in a longitudinal direction of said support;
- wherein each channel is defined by two walls extending in the longitudinal direction of said support, said two walls are interconnected by a web on one side of said support, and said two walls define an opening extending in the longitudinal direction of said support on another side of said support opposite to said web; and
- wherein a width of said opening for each channel in a direction orthogonal to said series of parallel channels is variable by elastically deforming said longitudinal walls between an access configuration giving access to said channel enabling a filamentary element to pass through said opening and a retaining configuration for retaining the filamentary element in said channel; and
- wherein the respective openings of successive channels alternately open out on opposite faces of said support; and
- wherein one of said two supports has a longitudinal wall defining a side edge of said support that is provided with a couple that attaches to a complementary couple carried by said other support.

14. The assembly according to claim 13, wherein said couple of said one support snap fastens with said complementary couple of said other support.

15. An assembly of two supports, each support comprising:
- a series of extending parallel channels extending in a longitudinal direction of said support;
- wherein each channel is defined by two walls extending in the longitudinal direction of said support, said two walls are interconnected by a web on one side of said support, and said two walls define an opening extending in the longitudinal direction of said support on another side of said support opposite to said web; and
- wherein a width of said opening for each channel in a direction orthogonal to said series of parallel channels is variable by elastically deforming said longitudinal walls between an access configuration giving access to said channel enabling a filamentary element to pass through said opening and a retaining configuration for retaining the filamentary element in said channel; and
- wherein one of said two supports has a longitudinal wall defining a side edge of said support that is provided with a couple that removably attaches to a complementary couple carried by said other support, so that said two supports are coupled to each other side by side in the direction orthogonal to said series of parallel channels.

16. The support according to claim 1, wherein each of the filamentary elements is loosely held and freely slides within its respective channel in the longitudinal direction of the support.

17. The support according to claim 5, wherein each of the filamentary elements is loosely held and freely slides within respective channels of the support in the longitudinal direction of the support.

18. An assembly of at least two supports, each according to claim 1, wherein each support has a longitudinal wall defining a side edge of the support that is provided with coupling means for co-operating with complementary coupling means carried by another support.

19. A bundle of small-diameter filamentary elements of a diameter less than or equal to 1 millimeter, wherein the filamentary elements are held together by a support according to claim 1.

20. The assembly according to claim 18, wherein the complementary coupling means of the at least two supports co-operate with each other by snap-fastening.

* * * * *